United States Patent
Liao et al.

(10) Patent No.: US 10,978,687 B2
(45) Date of Patent: Apr. 13, 2021

(54) MULTI-CORE-SINGLE-SHELL STRUCTURE OF A GEL POLYMER COATED SEPARATOR AND LITHIUM-ION BATTERY

(71) Applicant: Shenzhen Senior Technology Material Co., Ltd, Shenzhen (CN)

(72) Inventors: Liu-Hui Liao, Shenzhen (CN); Jiang Cao, Shenzhen (CN); Xue-Mei Yang, Shenzhen (CN); Bin Tan, Shenzhen (CN)

(73) Assignee: Shenzhen Senior Technology Material Co., Ltd., Shenzhen (CN)

( * ) Notice: Subject to any disclaimer, the term of this patent is extended or adjusted under 35 U.S.C. 154(b) by 369 days.

(21) Appl. No.: 15/683,674

(22) Filed: Aug. 22, 2017

(65) Prior Publication Data
US 2018/0358597 A1   Dec. 13, 2018

(30) Foreign Application Priority Data
Jun. 13, 2017   (CN) .......................... 201710445470.2

(51) Int. Cl.
| | | |
|---|---|---|
| *H01M 2/16* | (2006.01) | |
| *H01M 2/14* | (2006.01) | |
| *B82Y 40/00* | (2011.01) | |
| *H01M 10/0525* | (2010.01) | |
| *B82Y 30/00* | (2011.01) | |

(52) U.S. Cl.
CPC ........... *H01M 2/1686* (2013.01); *B82Y 40/00* (2013.01); *H01M 2/145* (2013.01); *H01M 2/16* (2013.01); *H01M 2/162* (2013.01); *H01M 2/1646* (2013.01); *H01M 2/1653* (2013.01); *B82Y 30/00* (2013.01); *H01M 10/0525* (2013.01)

(58) Field of Classification Search
CPC .. H01M 10/0525; H01M 2/14; H01M 2/1646; H01M 2/1653; H01M 2/162; H01M 2/145; H01M 2/1686; B82Y 40/00; B82Y 30/00
See application file for complete search history.

(56) References Cited

U.S. PATENT DOCUMENTS

| | | | |
|---|---|---|---|
| 2012/0301774 A1* | 11/2012 | Jiang ................. | H01M 2/166 429/144 |
| 2016/0164081 A1* | 6/2016 | Cui ................. | H01M 4/134 427/58 |

FOREIGN PATENT DOCUMENTS

| | | | |
|---|---|---|---|
| CN | 105047845 | * | 11/2015 |
| CN | 105602309 | * | 5/2016 |
| WO | 2015024479 A1 | | 2/2015 |
| WO | 2016201757 A1 | | 12/2016 |

OTHER PUBLICATIONS

CN105602309 MT (Year: 2016).*
CN 105047845 MT (Year: 2015).*
Park et al, Scientific Reports (2016), 6, 36977 (Abstract) (Year: 2016).*
Park et.al. Journal of Power Sources 196 (2011) 7035-7038 (Year: 2011).*

* cited by examiner

*Primary Examiner* — Alexander Usyatinsky
(74) *Attorney, Agent, or Firm* — Haverstock & Owens LLP

(57) ABSTRACT

A gel polymer coating separator with a multi-core-single-shell structure and a preparation method thereof for making lithium-ion batteries.

12 Claims, 6 Drawing Sheets

MULTI-CORE-SINGLE-SHELL STRUCTURE OF A GEL POLYMER COATED SEPARATOR AND LITHIUM-ION BATTERY

CROSS-REFERENCE TO RELATED APPLICATION(S)

This application claims priority to Chinese Patent Application Ser. No. 201710445470.2, filed Jun. 13, 2017 and titled, "A MULTI-CORE-SINGLE-SHELL STRUCTURE OF A GEL POLYMER COATED SEPARATOR AND LITHIUM-ION BATTERY," which is also hereby incorporated by reference in its entirety for all purposes.

FIELD OF THE INVENTION

The invention relates to a gel polymer coating separator having a multi-core-single-shell structure and a preparation method thereof, which relates to a lithium-ion battery.

BACKGROUND OF THE INVENTION

Since the lithium-ion battery has been commercialized and gradually expanded its application scope because of advantage aspects of a high energy density, high working-voltage, long circle-life and low self-discharge rate. The separator is one of the three essential materials of manufacturing lithium-ion battery, which is used to physically isolate the positive electrode so as to prevent an interior short circuit, ensure that the lithium ions are capable of passing the electrolyte, and move back and forth uniformly and freely between the positive electrode plate and the negative electrode plate.

Recently, the electric vehicles use of the lithium-ion battery has been rapidly developing. The energy density becomes one of the biggest challenges for the lithium-ion battery. People expect the energy density of the battery to reach a new level. Having a longer product life or a greater mileage usage is no longer a major consideration. The high-energy density of lithium-ion battery makes the safety, hardness, life cycle and other issues become significant. The typical solution is to coat the surface of the polyolefin separator with a functional coating, such as ceramic coating and polymer coating.

The heat shrinkage and wettability of the ceramic coating separator is improved to some extent, but the electrolyte in the battery is liquid and the leakage is unavoidable, while the hardness of the battery is not improved. Although, the polymer coating separator can improve the hardness of the battery, the battery resistance, performance and life cycle are affected. Although there is a composite coating mixing the polymer and the ceramic, the poor interface limits the range of applications.

SUMMARY OF THE INVENTION

In an aspect, a battery comprises an anode, a cathode, and a separator between the anode and the cathode, wherein the separator comprises a base coated with a coating containing elastic nanoparticles, inorganic nanoparticles, and an ionic conductive gel polymer.

In some embodiments, the coating has a composition having 5-20 wt % of the elastic nanoparticles, 5-30 wt % of the inorganic nanoparticles, and 50-90 wt % of the ionic conductive gel polymer. In other embodiments, the ionic conductive gel polymer comprises a multi-core-single-shell structure. In some other embodiments, the elastic nanoparticles comprise a BNR-PVC composite elastomer, a vulcanized rubber, a polyurethane elastomer, a fluorine elastomer, a polyether-polyester, a siloxane, or a combination thereof. In some embodiments, the inorganic nanoparticles comprise $TiO_2$, $Al_2O_3$, $BaTiO_3$, montmorillonite, $SiO_2$, $Ca_2CO_3$, $ZrO_2$, or a combination thereof. In some other embodiments, the ionic conductive gel polymer is copolymerized by at least two monomers selected from the group of acrylonitrile, methyl methacrylate, ethyl acrylate, hydroxyethyl acrylate, butyl acrylate, methacrylic acid, acrylic acid, and styrene.

In another aspect, a method of making a battery comprises forming a coating slurry by adding and stirring 90-95 wt % of a gel polymer having a multi-core-single-shell structure, 1-8 wt % of adhesive, and 0.5-5 wt % of a wetting agent into a solvent, applying the coating slurry on a substrate of a battery separator, and drying and forming the battery separator. In some embodiments, the adhesive is selected from the group consisting of polyvinyl alcohol, polyacrylamide, hydroxyethyl cellulose, carboxymethyl cellulose sodium, polyvinylpyrrolidone, and polyoxyethylene. In some other embodiments, the wetting agent is one or more material selected from the group consisting of alkyl phenol polyoxyethylene ether, Primary Alcobol Ethoxylate, Poly-oxyethylene alkylate ether, polyxyethylated alkylphenol, and polyoxyethylene aliphatic alcohol ether. In some embodiments, the solvent is one or more material selected from the group consisting of deionized water, ethanol, methanol, and ethylene glycol. In other embodiments, the substrate is a material selected from the group consisting of a polypropylene separator, a polyethylene separator, a PP-PE-PP multilayer separator, a single-side ceramic coating separator, a double-sides ceramic coating separator, and non-woven separator. In some other embodiments, the battery separator has a thickness between 5~50 μm, a porosity of 20%~70%, and an average pore size of 10~1000 nm.

In another aspect, a battery separator comprises a base of a battery separator and a coating on the base, wherein the coating contains a multi-core-single-shell structure.

In some embodiments, the coating has a composition having 5-20 wt % of the elastic nanoparticles, 5-30 wt % of high permittivity inorganic nanoparticles, and 50-90 wt % of the ionic conductive gel polymer. In other embodiments, the coating comprises a BNR-PVC composite elastomer, a vulcanized rubber, a polyurethane elastomer, a fluorine elastomer, a polyether-polyester, a siloxane, or a combination thereof. In some other embodiments, the coating comprises $TiO_2$, $Al_2O_3$, $BaTiO_3$, montmorillonite, $SiO_2$, $Ca_2CO_3$, $ZrO_2$, or a combination thereof. In some embodiments, the coating is copolymerized by at least two monomers selected from the group of acrylonitrile, methyl methacrylate, ethyl acrylate, hydroxyethyl acrylate, butyl acrylate, methacrylic acid, acrylic acid, and styrene. In some other embodiments, the base is a material selected from the group consisting of a polypropylene separator, a polyethylene separator, a PP-PE-PP multilayer separator, a single-side ceramic coating separator, a double-sides ceramic coating separator, and non-woven separator. In some embodiments, the battery separator is coupled with an anode and a cathode inside a lithium battery.

DETAILED DESCRIPTION

Detailed descriptions of the present disclosure and the beneficial technical thereof will be described in the connection with the accompanying Figures and the embodiments, but the present disclosures in not limited to that.
The present disclosures provide a separator of the lithium-ion battery.

Figure 1:
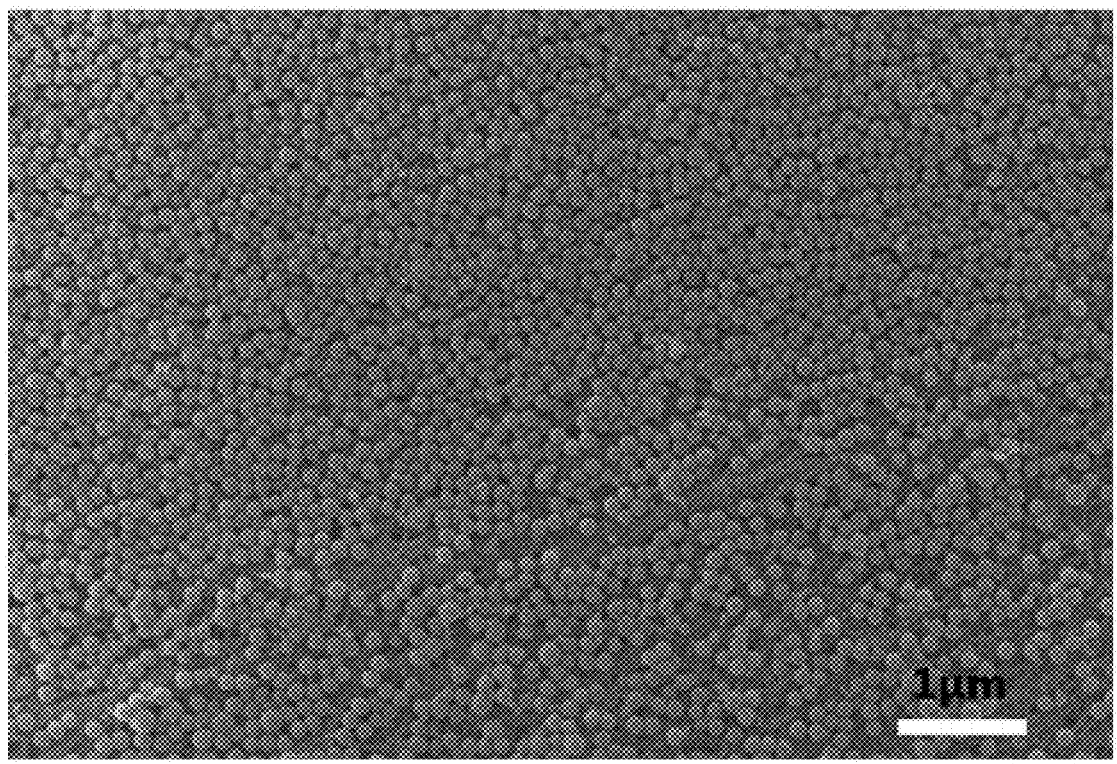
FIG. 1 shows the SEM picture of the multi-core-single-shell structure of gel polymer coating separator in accordance with some embodiments.

FIG. 1 illustrates a SEM photo of a multi-core-single-shell structured gel polymer coated separator in accordance with some embodiments. The separator has the advantages of both the ceramic coating separator and the polymer coating separator. The advantageous constructions in accordance with some embodiments include excellent temperature resistance, maintaining close adhesion with the anode and cathode, and significantly reducing the resistance and interface impedance of the battery, thereby the safety and performance are improved.

In an aspect, a method is disclosed for making a polymer coating separator fabricated by applying a multi-core-single-shell structure gel polymer on a base separator and making a lithium ion polymer battery fabricated by using the above material. The product produced from the above method has an efficient ionic conductivity, high permittivity (e.g., higher permittivity than the ceramic coating battery and the conventional polymer coating separator), good retention of capacity at a high discharge rate and excellent in product safety.

Figure 2:
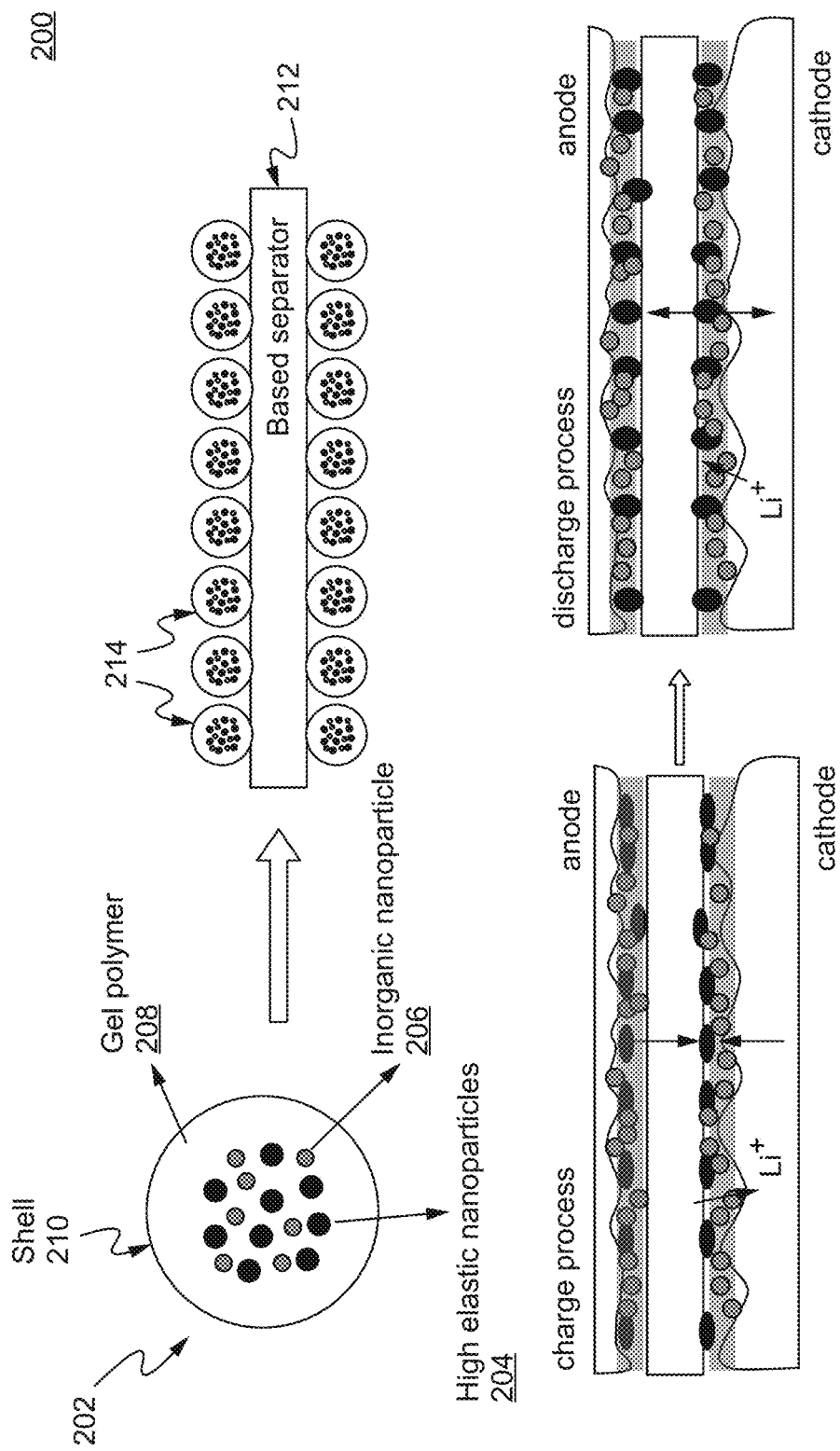
FIG. 2 is a schematic diagram of a multi-core-single-shell structure of gel polymer coating separator in the charging process and discharging process of the battery in accordance with some embodiments.

FIG. 2 illustrates a separator 200 of a lithium-ion battery having a substrate separator and a multi-core-single-shell structure gel polymer coating on one or both sides of the base 212 (e.g., base separator) in accordance with some embodiments. The core 202 of the coating comprises 5-20 wt % of highly elastic nanoparticles 204 and 5-30 wt % of high permittivity inorganic nanoparticles 206, and the shell 210 of the coating is 50-90 wt % of high ionic conductivity gel polymer 208.

A method is also disclosed for making a multi-core-single-shell structure gel polymer coated separator of a lithium ion battery. The method comprises polymerizing 5-20 wt % of nanoparticles, 5-30 wt % of inorganic nanoparticles, and 50-90 wt % of gel polymer monomer to obtain a multi-core-single-shell structure gel polymer 214.

In some embodiments, the separator comprises highly elastic nanoparticles formed by BNR-PVC composite elastomer, vulcanized rubber, polyurethane elastomer, fluorine elastomer, polyether-polyester, siloxane, or a combination thereof.

In some embodiments, the separator comprises high permittivity inorganic nanoparticles formed by a material selected from the group of $TiO_2$, $Al_2O_3$, $BaTiO_3$, montmorillonite, $SiO_2$, $Ca_2CO_3$, and $ZrO_2$.

In some embodiments, the shell of the separator comprises a gel polymer formed by copolymerizing at least two monomers selected from acrylonitrile, methyl methacrylate, ethyl acrylate, hydroxyethyl acrylate, butyl acrylate, methacrylic acid, acrylic acid, and styrene.

In some embodiments, a separator of a lithium ion battery preparation method comprises: first, forming a slurry by adding 90-95 wt % of multi-core-single-shell structure gel polymer, 1-8 wt % of adhesive and 0.5-5 wt % of wetting agent into a solvent and obtaining a uniform mixture with stirring; and second, coating/applying the slurry onto the one or both sides of a substrate of the separator, which is followed by drying such that a separator of a lithium ion battery is formed.

In some embodiments, the adhesive used for making the separator comprises one or more materials selected from the group consisting of polyvinyl alcohol, polyacrylamide, hydroxyethyl cellulose, carboxymethyl cellulose sodium, polyvinylpyrrolidone, and polyoxyethylene.

In some embodiments, the wetting agent used to make the separator comprises one or more materials selected from the group consisting of alkyl phenol polyoxyethylene ether, Primary Alcobol Ethoxylate, Poly-oxyethylene alkylate ether, polyxyethylated alkylphenol, and polyoxyethylene aliphatic alcohol ether.

In some embodiments, the solvent used to make the separator comprises one or more materials selected from the group consisting of deionized water, ethanol, methanol, and ethylene glycol.

In some embodiments, the base of the separator comprises one or more materials selected from the group consisting of a polypropylene separator, a polyethylene separator, a PP-PE-PP multilayer separator, a single-side ceramic coating separator, a double-sides ceramic coating separator, and non-woven separator. In some embodiments, the thickness of the base separator is 5~50 μm, which has the porosity 20%~70%, the average pore size is 10~1000 nm. In some embodiments, the thickness of the coating is 0.5~5 μm.

Compared with the water-based PVDF or acrylic resin coating separator, the multi-core-single-shell structure of gel polymer coating separator in accordance with some embodiments has the function of efficiently absorbing electrolyte and gel, excellent battery performance, including cycle and rate performance.

Figure 4:
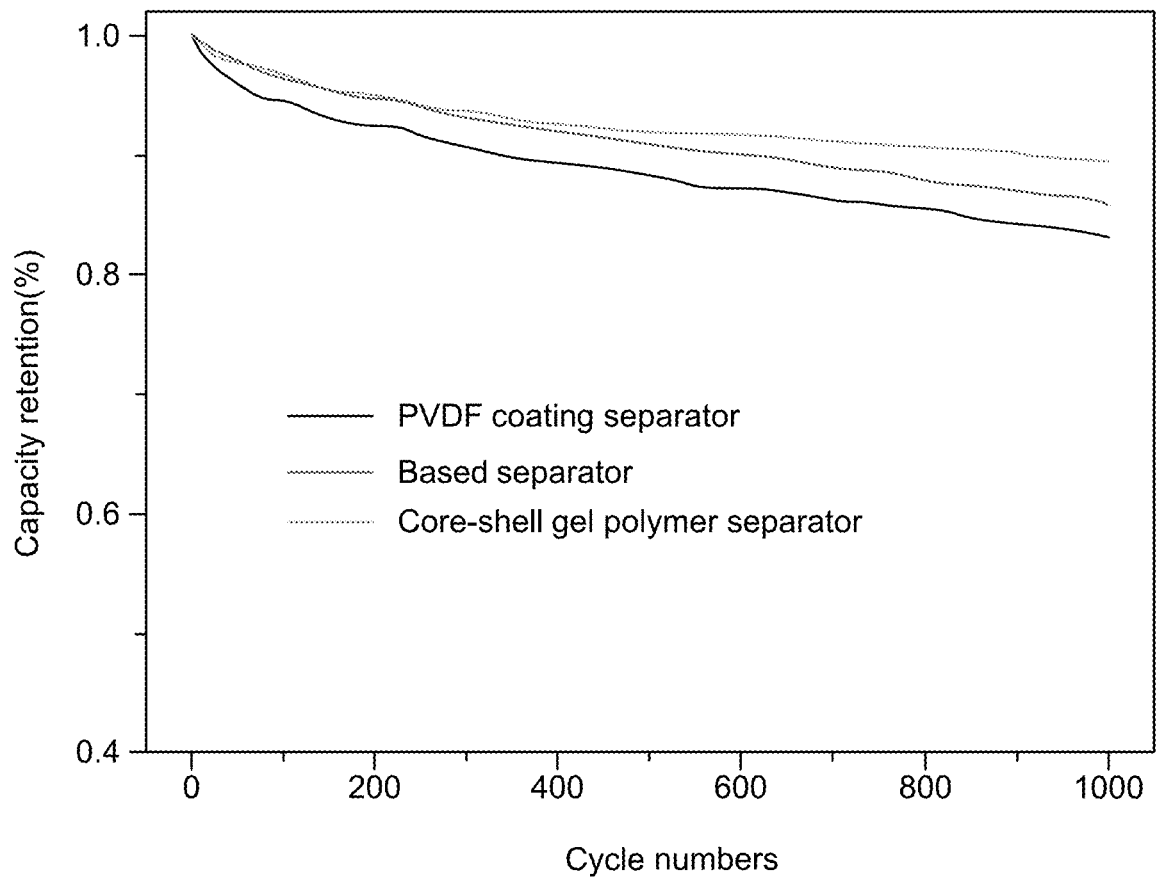
FIG. 4 is a graph showing the cycle performance of lithium-ion batteries fabricated using a multi-core-single-shell structure of gel polymer coating separator, water-based PVDF coating separator, and base separator in accordance with some embodiments.
Figure 5:
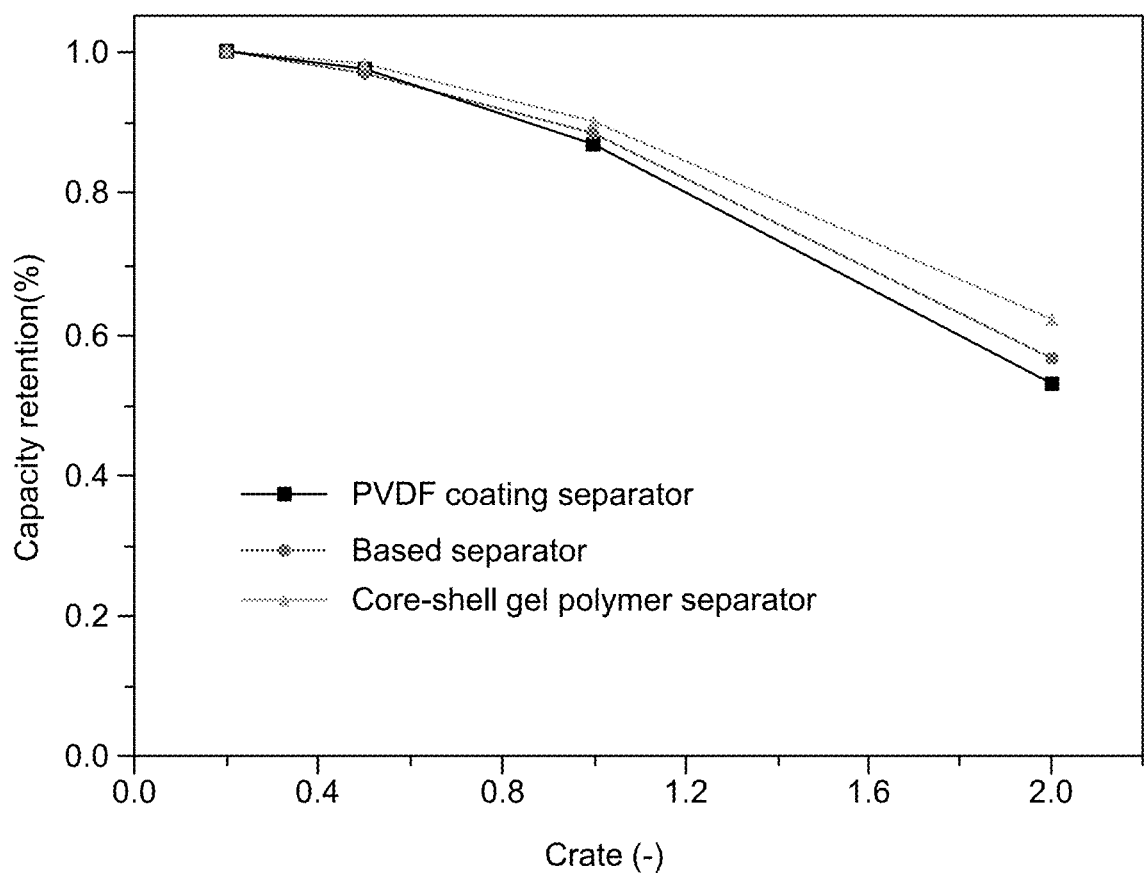
FIG. 5 is a graph showing the rate performance of lithium-ion batteries fabricated from multi-core-single-shell structure of gel polymer coating separator, water-based PVDF coating separator, and base separator in accordance with some embodiments.
Figure 6:
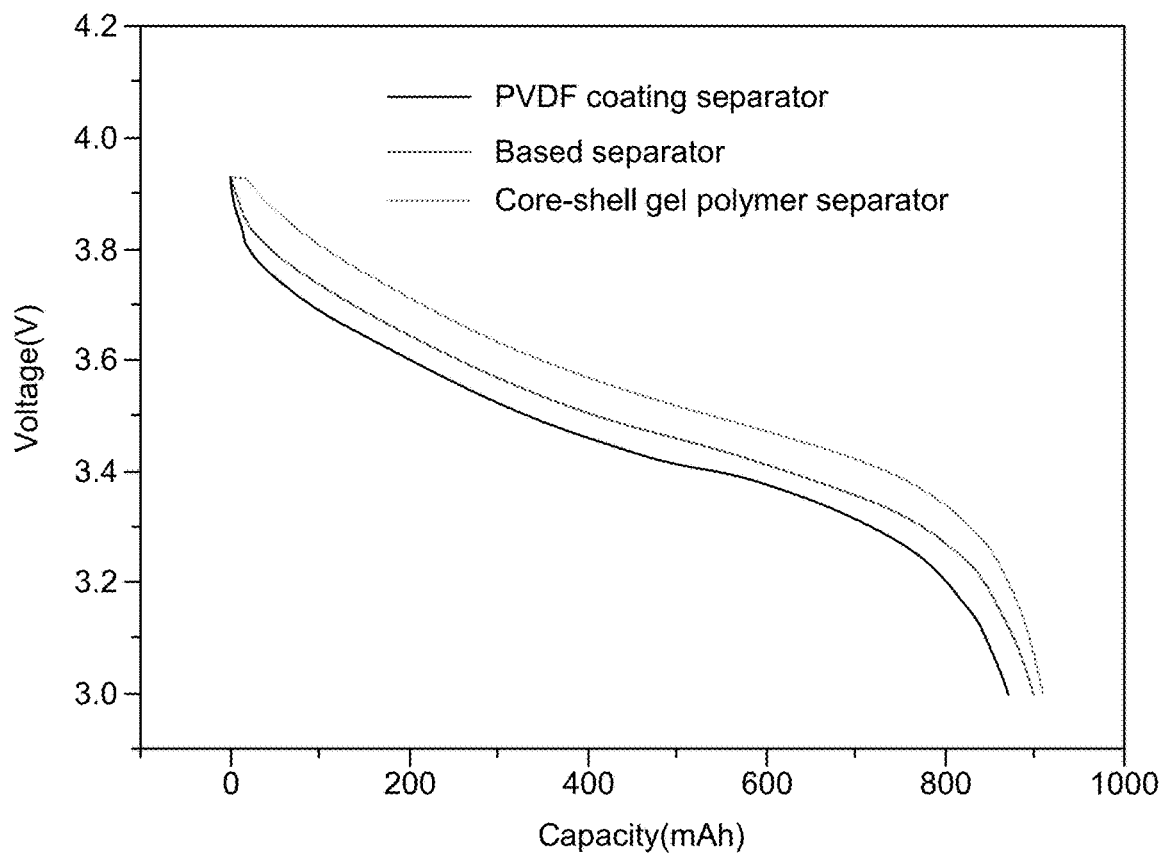
FIG. 6 is a graph of discharging curves of lithium-ion batteries fabricated from multi-core-single-shell structure of gel polymer coating separator, water-based PVDF coating separator, and base separator (the 1000th cycle) in accordance with some embodiments.

FIGS. 4, 5, and 6 show the experimental data of the multi-core-single-shell structure gel polymer coating separator for lithium-ion battery, which can be used to make the gel state polymer lithium-ion battery resulted in improved manufacturing efficiency, safety, and consistency can be improved.

Due to its special core-shell structure, the micro-phase separation occurs between the inorganic nanoparticles dispersed in the core layer and the gel polymer in the state when the coating absorbs the electrolyte, resulting in a large amount of interface voids, which forms a channel that facilitates rapid ion transport, that is, fast ion channels. At the same time, when the coating absorbs the electrolyte gel, the dispersed nanoparticles inside the core-shell structure are in a metastable state and the nanoparticles are isolated from the gel polymer to the surface of the coating.

During the charging process, the high elasticity of the nanoparticles is deformed by the extrusion action caused by the expansion of the negative electrode. During the discharge process, the electrode layer shrinks and the deformation of the high elasticity of the nanoparticles is restored. Therefore, during the charging and discharging process, there is always interaction between the separator and the electrode, so that the separator and the electrode can keep in close contact, effectively avoid the contact gap caused by the expansion-contraction of electrode material, and can effectively inhibit the thickness changes of the battery.

The high permittivity inorganic nanoparticles can effectively reduce the energy barrier of lithium ion from the electrode to the electrolyte transfer process, to reduce the interface resistance and improve rate performance. At the same time, the coating increase the separator of the wettability, effectively improve the battery cycle performance.

Example 1

A multi-core-single-shell structure of gel polymer is prepared through polymerization reaction generated by highly elastic nanoparticles, high permittivity inorganic nanoparticles, and gel polymer monomer in a mass of 20:10:70. The highly elastic nanoparticles are BNR-PVC composite elastomer, the inorganic nanoparticles are a mixture of $TiO_2$ and $Al_2O_3$ in a mass ratio of 8:2, the gel polymer monomer is acrylonitrile and methyl methacrylate in a mass ratio of 3:7.

Example 2

A multi-core-single-shell structure of gel polymer is prepared through polymerization reaction generated by highly elastic nanoparticles, high permittivity inorganic nanoparticles, and gel polymer monomer in a mass of 15:8:77. The highly elastic nanoparticles are a mixture of vulcanized rubber and polyurethane elastomer in a mass ratio of 4:6, the inorganic nanoparticles are a mixture of $BaTiO_3$ and $Ca_2CO_3$ in a mass ratio of 3:7, the gel polymer monomer is a mixture of acrylonitrile and methyl methacrylate in a mass ratio of 5:5.

Example 3

A multi-core-single-shell structure of gel polymer is prepared through polymerization reaction generated by highly elastic nanoparticles, high permittivity inorganic nanoparticles, and gel polymer monomer in a mass of 10:25:65. The highly elastic nanoparticles are polyether-polyester, the inorganic nanoparticles are a mixture of $ZrO_2$ and $Ca_2CO_3$ in a mass ratio of 6:4, the gel polymer monomer is a mixture of ethyl acrylic acid and hydroxyethyl acrylate in a mass ratio of 2:8. The coating comprised 92 wt % of multi-core-single-shell structure of gel polymer, 5 wt % of adhesive and 3 wt % of wetting agent, the adhesive is a mixture of polyvinyl alcohol and polyvinylpyrrolidone in a mass of 5:5, the wetting agent is alkyl phenol polyoxyethylene ether, the solvent for the coating slurry is deionized water. The coating slurry is coated on the base separator; the base separator is a single-side ceramic coating separator with a thickness of 18 μm, a porosity of 45% and an average pore diameter of 42 nm. A thickness of the coating is 1 μm. The absorption capacity of the separator to the electrolyte was 15 g/m².

Example 4

A multi-core-single-shell structure of gel polymer is prepared through polymerization reaction generated by highly elastic nanoparticles, high permittivity inorganic nanoparticles, and gel polymer monomer in a mass of 15:10:75. The highly elastic nanoparticles are vulcanized rubber, the inorganic nanoparticles are a mixture of $SiO_2$ and $ZrO_2$ in a mass ratio of 3:7, the gel polymer monomer is a mixture of methyl methacrylate and butyl acrylate in a mass ratio of 1:9. The coating comprised 94 wt % of multi-core-single-shell structure of gel polymer, 4 wt % of adhesive and 2 wt % of wetting agent, the adhesive is a mixture of polyacrylamide and hydroxyethyl cellulose in a mass of 3:7, the wetting agent is polyxyethylated alkylphenol, the solvent for the coating slurry is ethanol. The coating slurry is coated on the base separator; the base separator is double-sides ceramic coating separator with a thickness of 25 μm, a porosity of 42% and an average pore diameter of 32 nm. A thickness of the coating is 2 μm. The separator prepared in EXAMPLE 4 is assembled into a lithium-ion battery, and subjected to hot pressing condition of 2 MP, 85° C., 20 s. The peeling strength between the separator and the electrode is measured by a universal tensile tester of 65 N/mm, and the hardness of the battery is measured by a three-point bending method of 21.3 N/cm.

Example 5

A multi-core-single-shell structure of gel polymer is prepared through polymerization reaction generated by highly elastic nanoparticles, high permittivity inorganic nanoparticles, and gel polymer monomer in a mass of 8:25:67. The highly elastic nanoparticles are mixture of siloxane and fluorine elastomer in a mass of 2:8, the inorganic nanoparticles are mixture of $Al_2O_3$ and montmorillonite in a mass of 6:4, and the gel polymer monomer is a mixture of styrene, butyl acrylate and hydroxyethyl acrylate in a mass ratio of 7:1.5:1.5. The coating comprises 94 wt % of multi-core-single-shell structure of gel polymer, 3 wt % of adhesive and 3 wt % of wetting agent, the adhesive is a mixture of polyoxyethylene and polyvinyl alcohol in a mass of 2:8, the wetting agent is a mixture of Primary Alcobol Ethoxylate and Poly-oxyethylene alkylate ether in a mass of 5:5, the solvent for the coating slurry is methanol. The coating slurry is coated on the base separator; the base separator is nonwoven separator with a thickness of 40 μm, a porosity of 65% and an average pore diameter of 100 nm. A thickness of the coating is 8 μm. The separator prepared in EXAMPLE 5 is assembled into a model for linear scanning.

Figure 3:
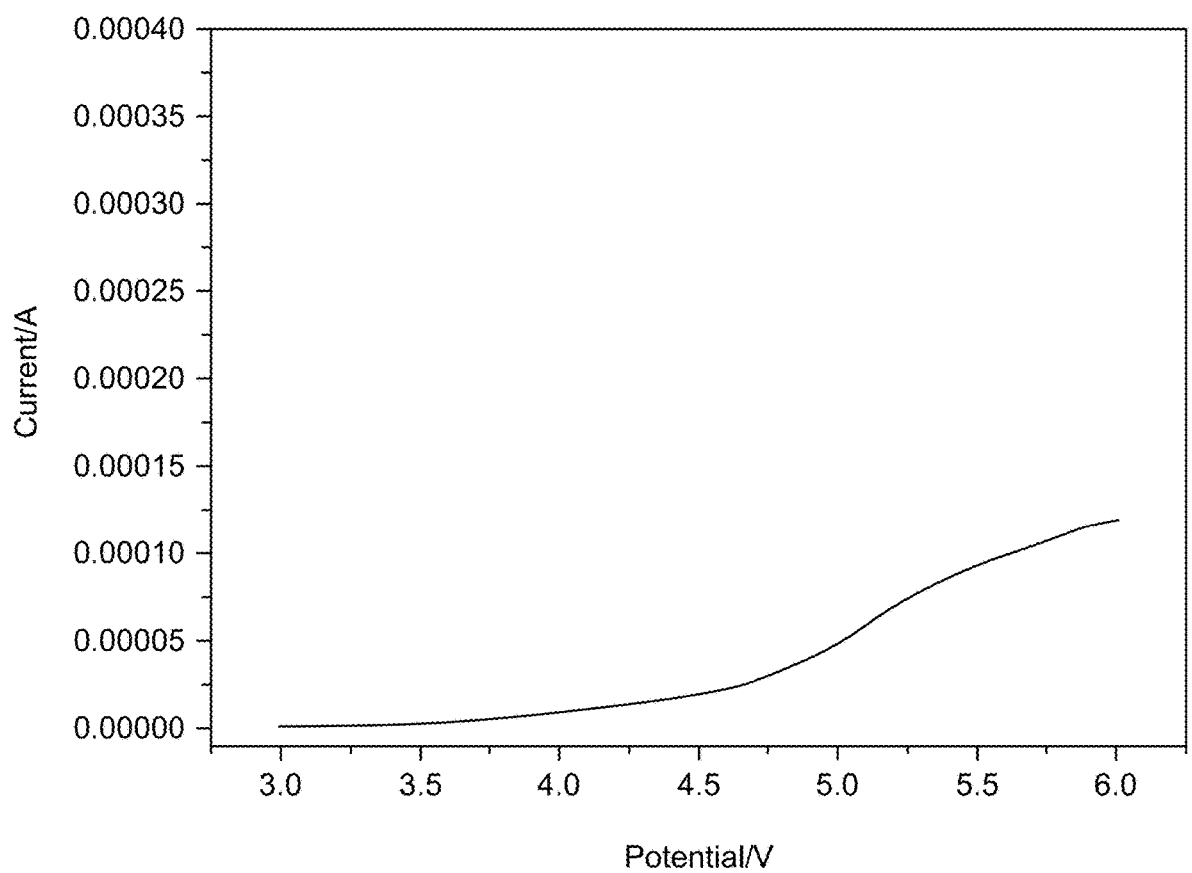
FIG. 3 is a graph showing the electrochemical window of a multi-core-single-shell structure of gel polymer coating separator in accordance with some embodiments.

FIG. 3 shows that the electrochemical window of the separator is 4.5V, which is comparable to the electrolyte system and can be perfectly suited for use in lithium ion batteries.

Example 6

A multi-core-single-shell structure of gel polymer is prepared through polymerization reaction generated by highly elastic nanoparticles, high permittivity inorganic nanoparticles, and gel polymer monomer in a mass of 18:20:62. The highly elastic nanoparticles are polyurethane elastomer, the inorganic nanoparticles are $BaTiO_3$, and the gel polymer monomer is a mixture of styrene, butyl acrylate, and acrylic acid in a mass ratio of 8:1:1. The coating comprises 93 wt % of multi-core-single-shell structure of gel polymer, 5 wt % of adhesive and 2 wt % of wetting agent, the adhesive is carboxymethyl cellulose sodium, the wetting agent is polyoxyethylene aliphatic alcohol ether, the solvent for the coating slurry is a mixture of ethanol and deionized water in a mass of 5:5. The coating slurry is coated on the base separator; the base separator comprises PP-PE-PP multilayer separator with a thickness of 17 μm, a porosity of 56% and an average pore diameter of 22 nm. A thickness of the coating is 4 μm.

The separator prepared in EXAMPLE 6 is assembled into a lithium-ion battery. FIG. 4 shows the capacity retention ratio remained over 90% after 1000 cycle numbers under a condition of 0.1 C. FIG. 5 shows the capacity retention ratio remained over 50% at the rate of 2 C.

Example 7

A multi-core-single-shell structure of gel polymer is prepared through polymerization reaction generated by highly elastic nanoparticles, high permittivity inorganic nanoparticles, and gel polymer monomer in a mass of 12:8:80. The highly elastic nanoparticles comprise BNR-PVC composite elastomer, the inorganic nanoparticles are mixture of $BaTiO_3$ and $TiO_2$ in a mass of 3:7, and the gel polymer monomer is a mixture of methyl methacrylate, butyl acrylate and acrylonitrile in a mass ratio of 6:1:3. The coating comprises 93.5 wt % of multi-core-single-shell structure of gel polymer, 5 wt % of adhesive and 1.5 wt % of wetting agent, the adhesive comprises a mixture of polyvinylpyrrolidone amd hydroxyethyl cellulosel in a mass of 6:4, the wetting agent comprises alkyl phenol polyoxyethylene ether, the solvent for the coating slurry comprises a mixture of ethylene glycol and deionized water. The coating slurry is coated on the base separator; the base separator comprises a polypropylene separator with a thickness of 20 μm, a porosity of 61% and an average pore diameter of 46 nm. A thickness of the coating is 1 μm.

Comparison 1

A typical ceramic coating separator comprises a base separator and a single-side $Al_2O_3$ coating. The base separator is polypropylene separator with a thickness of 12 μm and a porosity of 45%. A thickness of the coating was 4 μm.

Comparison 2

A typical water-based PVDF coating separator comprises a base separator and a double-sides PVDF coating. The base separator comprises a polypropylene separator with a thickness of 12 μm and a porosity of 45%. A thickness of the coating was 2 μm.

Comparison 3

A separator with a thickness of 12 μm and a porosity of 45%, and the surface is not subjected to a coating treatment.

The ion conductivity tests of the separator of Examples 3-7 and Comparative Examples 1-3 are carried out, and the separator is assembled into an analog battery, and the ion conductivity of the separators are measured using alternating-current impedance. The test results are listed in Table 1.

TABLE 1

Results of ion conductivity test of the separator of Examples 3-7 and Comparative Examples 1-3.

| | Example 3 | Example 4 | Example 5 | Example 6 | Example 7 | Comparison 1 | Comparison 2 | Comparison 3 |
|---|---|---|---|---|---|---|---|---|
| ion conductivity S/cm | $2.87 \times 10^{-3}$ | $2.62 \times 10^{-3}$ | $2.57 \times 10^{-3}$ | $2.85 \times 10^{-3}$ | $2.76 \times 10^{-3}$ | $2.12 \times 10^{-3}$ | $1.11 \times 10^{-3}$ | $1.96 \times 10^{-3}$ |

As shown in table 1, a coating of multi-core-single-shell structure gel polymer has the function of efficiently absorbing electrolyte and gel, the micro-phase separation between the inorganic nanoparticles and gel polymer provides a large number of ion-conductive pore channels, which facilitates the migration efficiency of lithium ions in the separator and increases the ionic conductivity.

Figure 7:
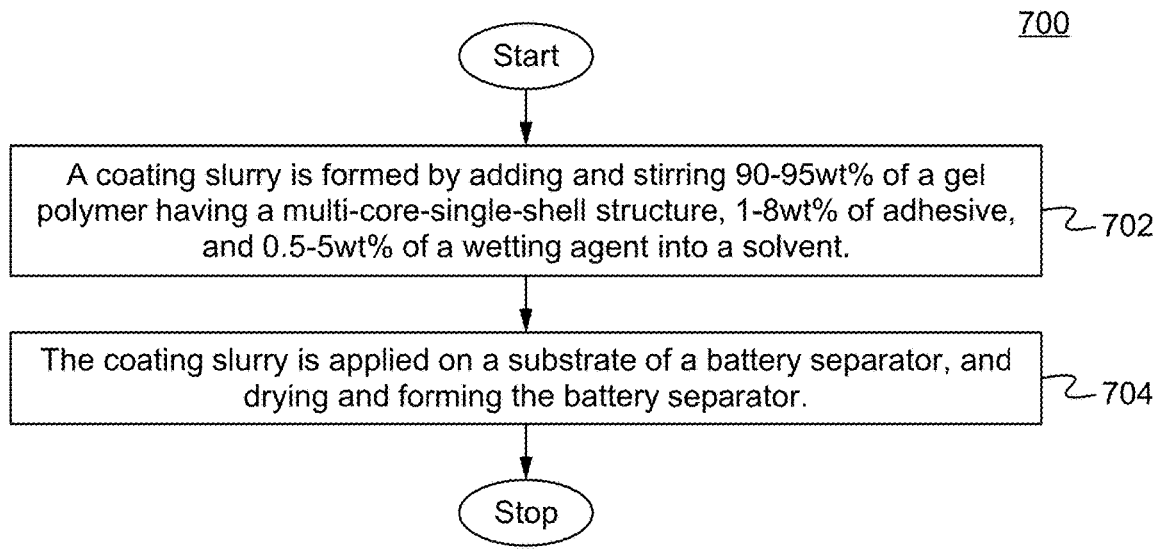
FIG. 7 illustrates a method of making the separator in accordance with some embodiments.

FIG. 7 illustrates a method 700 of making the separator of a battery in accordance with some embodiments. At Step 702, a coating slurry is formed by adding and stirring 90-95 wt % of a gel polymer having a multi-core-single-shell structure, 1-8 wt % of adhesive, and 0.5-5 wt % of a wetting agent into an aqueous solvent. At Step 704, the coating slurry is applied on a substrate of a battery separator, and drying and forming the battery separator.

In utilization, the gel polymer having a multi-core-single-shell structure is applied on a substrate, which is used as part of a lithium and other type of batteries.

In operation, forming a coating slurry by adding and stirring 90-95 wt % of a gel polymer having a multi-core-single-shell structure, 1-8 wt % of adhesive, and 0.5-5 wt % of a wetting agent into an aqueous solvent, applying the coating slurry on a substrate of a battery separator, and drying and forming the battery separator.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims. Features in various examples or embodiments are applicable throughout the Present Specification.

What is claimed is:

1. A battery comprising:
   a. an anode;
   b. a cathode; and
   c. a separator between the anode and the cathode, wherein the separator comprises a base coated with a coating having nanoparticles with a multi-core-single-shell structure, wherein the multi-core-single-shell structure comprises an ionic conductive gel polymer enclosing both a type of elastomeric nanoparticles and a type of inorganic nanoparticles, wherein the separator has an ion conductivity between $2.57 \times 10^{-3}$ S/cm and $2.85 \times 10^{-3}$ S/cm.

2. The battery of claim 1, wherein the coating has a composition having 5-20 wt % of the elastomeric nanoparticles, 5-30 wt % of the inorganic nanoparticles, and 50-90 wt % of the ionic conductive gel polymer.

3. The battery of claim 1, wherein the elastomeric nanoparticles comprises a BNR-PVC composite elastomer, a vulcanized rubber, a polyurethane elastomer, a fluorine elastomer, a polyether-polyester, a siloxane, or a combination thereof.

4. The battery of claim 1, wherein the inorganic nanoparticles comprises $TiO_2$, $Al_2O_3$, $BaTiO_3$, montmorillonite, $SiO_2$, $Ca_2CO_3$, $ZrO_2$, or a combination thereof.

5. The battery of claim 1, wherein the ionic conductive gel polymer is copolymerized by at least two monomers selected from the group of acrylonitrile, methyl methacrylate, ethyl acrylate, hydroxyethyl acrylate, butyl acrylate, methacrylic acid, acrylic acid, and styrene.

6. A battery separator comprising:
   a. a base of a battery separator;
   b. a coating on the base, wherein the coating contains a multi-core-single-shell structure containing at least two types of nanoparticles having a type of elastomeric nanoparticles and a type of high permittivity inorganic nanoparticles; and
   c. ionic conductive gel polymer particles, wherein each of the ionic conductive gel polymer particles encloses the at least two types of nanoparticles, wherein the separator has an ion conductivity between $2.57 \times 10^{-3}$ S/cm and $2.85 \times 10^{-3}$ S/cm.

7. The battery separator of claim 6, wherein the coating has a composition having 5-20 wt % of the elastomeric nanoparticles, 5-30 wt % of the high permittivity inorganic nanoparticles, and 50-90 wt % of the ionic conductive gel polymer.

8. The battery separator of claim 6, wherein the coating comprises a BNR-PVC composite elastomer, a vulcanized rubber, a polyurethane elastomer, a fluorine elastomer, a polyether-polyester, a siloxane, or a combination thereof.

9. The battery separator of claim 6, wherein the coating comprises $TiO_2$, $Al_2O_3$, $BaTiO_3$, montmorillonite, $SiO_2$, $Ca_2CO_3$, $ZrO_2$, or a combination thereof.

10. The battery separator of claim 6, wherein the coating is copolymerized by at least two monomers selected from the group of acrylonitrile, methyl methacrylate, ethyl acrylate, hydroxyethyl acrylate, butyl acrylate, methacrylic acid, acrylic acid, and styrene.

11. The battery separator of claim 6, wherein the base is a material selected from the group consisting of a polypropylene separator, a polyethylene separator, a PP-PE-PP multilayer separator, a single-side ceramic coating separator, a double-sides ceramic coating separator, and non-woven separator.

12. The battery separator of claim 6, wherein the battery separator is coupled with an anode and a cathode inside a lithium battery.

* * * * *